F. HAGEN.
FEEDER FOR CORN SHREDDERS.
APPLICATION FILED JUNE 28, 1910.

989,704.

Patented Apr. 18, 1911.

2 SHEETS—SHEET 1.

F. HAGEN.
FEEDER FOR CORN SHREDDERS.
APPLICATION FILED JUNE 28, 1910.
989,704.
Patented Apr. 18, 1911.
2 SHEETS—SHEET 2.
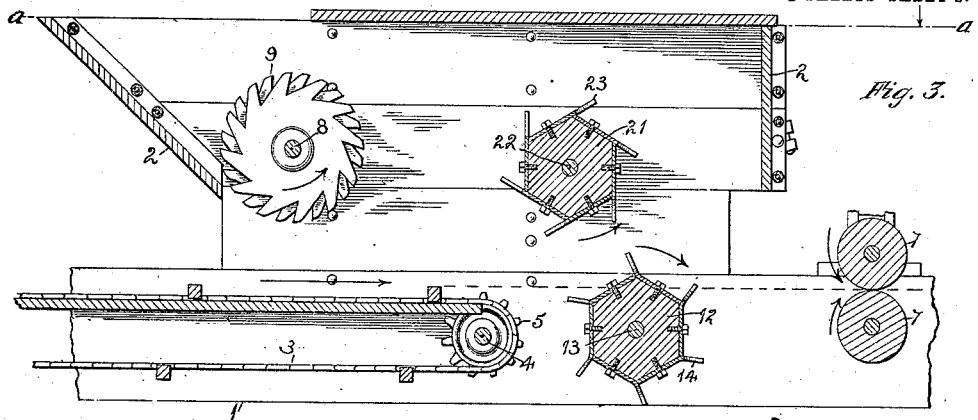
Fig. 3.
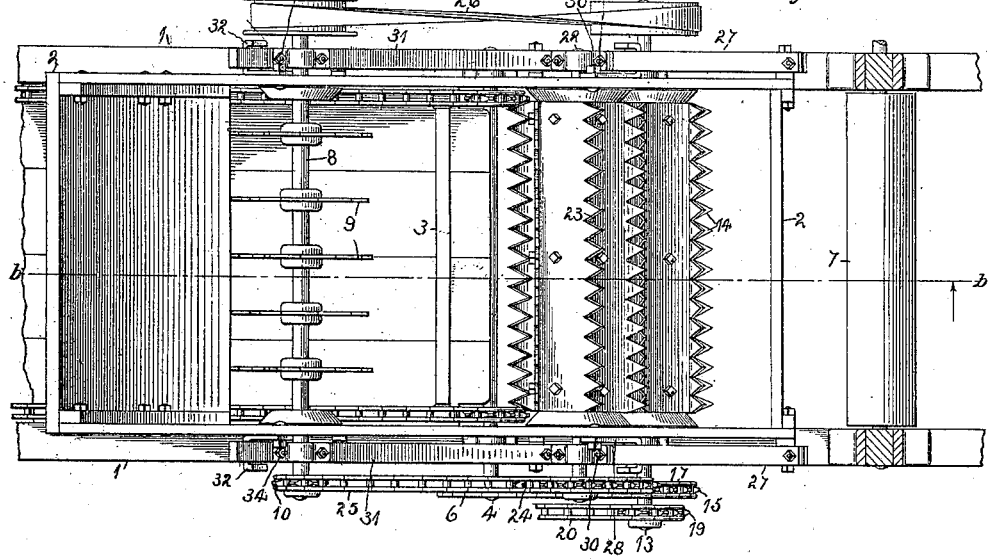
Fig. 4.
Fig. 5.
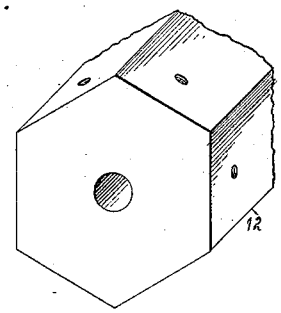
Witnesses:
C. B. Clark
E. Behel
Inventor:
Fredrick Hagen
By A. O. Behel
Atty.

UNITED STATES PATENT OFFICE.

FREDRICK HAGEN, OF BELVIDERE, ILLINOIS.

FEEDER FOR CORN-SHREDDERS.

989,704.

Specification of Letters Patent.

Patented Apr. 18, 1911.

Application filed June 28, 1910. Serial No. 569,410.

*To all whom it may concern:*

Be it known that I, FREDRICK HAGEN, a citizen of the United States, residing at Belvidere, in the county of Boone and State of Illinois, have invented certain new and useful Improvements in Feeders for Corn-Shredders, of which the following is a specification.

The object of this invention is to construct a feeder for corn shredders in which two distributing heads are rotated at different speeds in order that the upper stratum of stalks may be held back by one head while the lower stratum of stalks will be carried toward the snapping rolls.

Figure 1:
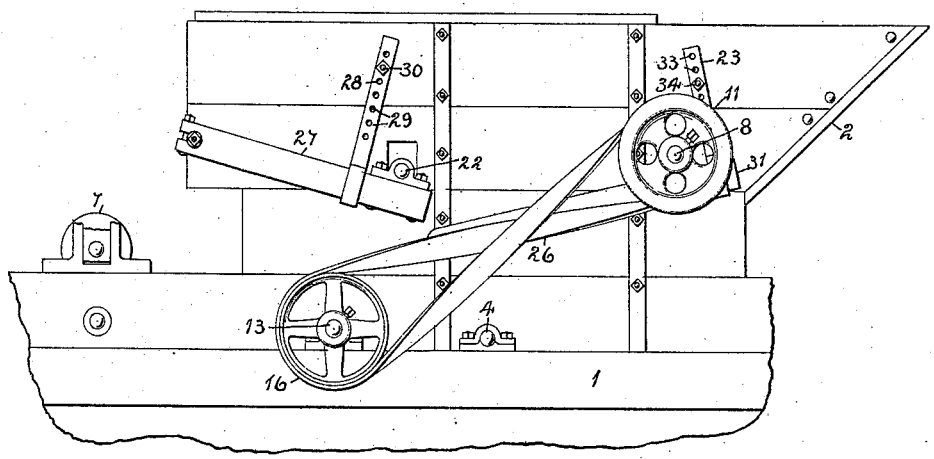
Figure 2:
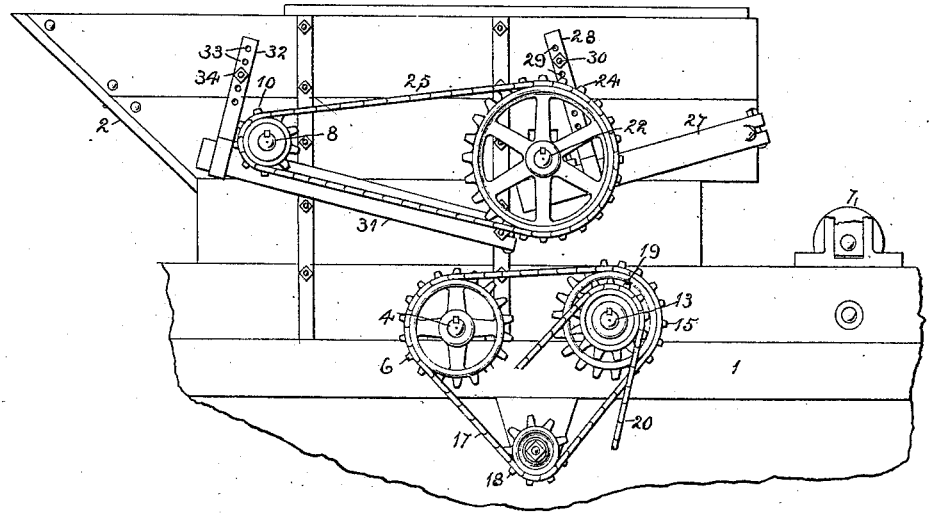

In the accompanying drawings, Figure 1 is a side elevation of a shredder containing my improvements. Fig. 2 is an elevation of the reverse side to that shown at Fig. 1. Fig. 3 is a vertical section on dotted line $b\ b$ Fig. 4. Fig. 4 is a plan view on dotted line $a\ a$ Fig. 3, in which the top board is removed, and the bearing for the upper snapper roll is in section. Fig. 5 is a perspective view of a portion of one of the hexagonal sections of a distributing head.

The main frame of the shredder comprises the sides 1 connected in this instance by the cross-bars 2. An endless carrier 3 is supported by a shaft 4, and moved by the sprocket wheel 5. To one end of this shaft 4 is secured a sprocket wheel 6. Two snapping rolls 7 are supported to be rotated by any suitable connection with the main drive, which is not deemed necessary to show.

A band cutter comprises a shaft 8 to which are connected a plurality of cutter heads 9. A sprocket wheel 10 is secured to one end of this shaft and a pulley 11 is secured to the other end of the shaft. These cutter heads are supported to rotate in the direction indicated by the arrow on Fig. 3.

A distributing head is located adjacent to the delivery end of the endless carrier 3, and comprises the hexagonal center 12 secured to a shaft 13 to be rotated thereby. To each of the faces of the center 12 is secured a saw toothed plate 14. The saw teeth of these plates are inclined backward with respect to the direction of rotation. To one end of the shaft 13 is secured a sprocket wheel 15, and to the other end of this shaft is secured a pulley 16, a linked chain 17 passes over the sprocket wheels 6 and 15 and under an idler 18. A sprocket wheel 19 is secured to the shaft 13 and is rotated by the linked chain 20 moved by a connection with the prime mover.

Another distributing head is located above the distributing head just described and between it and the delivery end of the endless carrier. This distributing head comprises a hexagonal center 21 secured to a shaft 22. To each of the faces of this hexagonal center 21 is secured a saw-toothed cutter 23 which is located tangential with respect to the shaft 22 and forms a continuation of the face, and extends rearwardly with relation to the direction of rotation of the complete head as shown by the arrow on Fig. 3. To one end of the shaft 22 is secured a sprocket wheel 24 and a chain belt 25 connects the sprocket wheels 10 and 24. A crossed belt 26 connects the pulleys 11 and 16, and as pulley 16 is the driver, the band cutters will be rotated in a direction opposite to the lower distributing head.

The shaft 22 is mounted in pivotal bearings 27 which are made adjustable and held when adjusted by the straps 28 provided with holes 29 through which a bolt 30 may be passed and connecting it with the main frame.

The shaft 8 is mounted in pivotal bearings 31 which are made adjustable and held when adjusted by the straps 32 provided with holes 33 through which a bolt 34 may be passed and connecting it with the main frame. By making the shaft 8 vertically adjustable, the band cutters supported by it may be held at different distances above the endless carrier 3, and by making the shaft 22 vertically adjustable, the distributing head supported by it may be held at different distances above the distributing head supported by the shaft 13.

In use the distributing heads, band cutter, endless carrier and snapping rolls are moved in the direction indicated by the arrows shown at Fig. 3. The corn stalks are dropped onto the endless carrier and pass under the band cutters which sever the bands, thereby liberating the stalks and permitting them to spread out. As the stalks pass between the distributing heads and as the lower head rotates faster than the upper head, the lower stratum of stalks will be moved faster than the upper stratum, thereby presenting the stalks to the snapping rolls in a thin sheet or layer.

By locating the saw teeth 14 of the lower distributing head at the angle shown, they will more fully free themselves from the stalks.

I claim as my invention.

1. In a corn shredder, the combination with a conveyer, of upper and lower rotary distributers associated with the delivery end of the conveyer, one being a delivery distributer, the other a retarding distributer, said distributers having projecting teeth, the teeth of the retarding distributer being tangential to its axis of rotation, the teeth of the delivery distributer being more nearly radial, and means for rotating the distributers.

2. In a corn shredder, the combination with a conveyer, of upper and lower rotary distributers associated with the delivery end of the conveyer, said distributers each comprising a polygonal body, and blades with saw teeth secured to the different faces of the bodies, the teeth of the blades of the upper body being disposed substantially in the same planes as the blades having such teeth and those on the lower body being set at an angle to the blades and more nearly radial to the axis of rotation of the body, and means for rotating the distributer in opposite directions and at different rates of speed.

In testimony whereof I have hereunto set my hand in presence of two subscribing witnesses.

FREDRICK HAGEN.

Witnesses:
A. O. BEHEL,
E. D. E. N. BEHEL.

---

Copies of this patent may be obtained for five cents each, by addressing the "Commissioner of Patents, Washington, D. C."